United States Patent [19]

Selby, III

[11] 4,145,279

[45] Mar. 20, 1979

[54] WATER RECYCLING SYSTEM

[75] Inventor: Howard W. Selby, III, Boulder, Colo.

[73] Assignee: Pure Cycle Corporation, Boulder, Colo.

[21] Appl. No.: 762,103

[22] Filed: Jan. 24, 1977

[51] Int. Cl.² .................... C02B 1/40; C02C 1/04; C02C 1/18

[52] U.S. Cl. .................... 210/17; 210/25; 210/27; 210/29; 210/35; 210/73 S; 210/108; 210/142; 210/143; 210/151; 210/167; 210/257 M; 210/297

[58] Field of Search .......... 210/25, 27, 29, 35, 210/64, 73 R, 73 S, 97, 98, 102, 141, 142, 150, 151, 167, 257 R, 257 M, 266, 269, 275, 284, 297, 319, 321 R, 326, 331, 332, 393, 402, 501, 86, 96 R, 103, 104, 105, 108, 134, 135, 143, 17, 96 M

[56] References Cited

U.S. PATENT DOCUMENTS

| | | | |
|---|---|---|---|
| 3,276,458 | 10/1966 | Iversen et al. | 210/167 |
| 3,291,308 | 12/1966 | Headrick et al. | 210/101 |
| 3,296,122 | 1/1967 | Karassik et al. | 210/2 |
| 3,373,873 | 3/1968 | Parmentier | 210/331 |
| 3,408,289 | 10/1968 | Gustafson | 210/27 |
| 3,429,807 | 2/1969 | Burgess | 210/25 |
| 3,478,884 | 11/1969 | McPherson et al. | 210/167 |
| 3,527,718 | 9/1970 | Coburn | 210/35 |
| 3,607,739 | 9/1971 | Thorborg | 210/33 |
| 3,634,229 | 1/1972 | Stanley | 210/33 |
| 3,705,648 | 12/1972 | Arvanitakis | 210/73 S |
| 3,825,494 | 7/1974 | Call et al. | 210/142 |
| 3,850,801 | 11/1974 | Pearson | 210/86 |
| 3,862,030 | 1/1975 | Goldberg | 210/501 |
| 3,869,382 | 3/1975 | Tejeda | 210/25 |
| 3,920,550 | 11/1975 | Farrell | 210/86 |
| 3,923,656 | 12/1975 | Krebs et al. | 210/86 |
| 3,969,242 | 7/1976 | Kruse | 210/25 |
| 3,980,556 | 9/1976 | Besik | 210/6 |
| 3,998,740 | 12/1976 | Bost et al. | 210/257 R |
| 4,008,159 | 2/1977 | Besik | 210/7 |

OTHER PUBLICATIONS

"Cycle–Let," Thetford Corp., Waste Treatment Products Div. Technical Bulletin, Ann Arbor, Mich. (undated).

Primary Examiner—Thomas G. Wyse
Assistant Examiner—Ivars Cintins
Attorney, Agent, or Firm—Woodcock, Washburn, Kurtz & Mackiewicz

[57] ABSTRACT

A closed water recycling system produces portable drinking water from total domestic waste-water, including household sewage. A microprocessor monitors the operation of the system and automatically back-flushes the ultra-filter assembly, regenerates the ion exchange bed when the monitored variables indicate this is necessary, and acts as a failsafe monitor to insure water quality by shutting down the system in case of a malfunction. For example, the bed includes acid and base regenerated resins having different specific gravities. When a monitor indicates that the bed requires regeneration, a water flush separates resins by specific gravity. Acid and bas regenerating solutions are supplied to opposite sides of the bed. The flow of regenerating solution is stopped when the salt band produced during regeneration approaches an outlet at the middle of the bed. By stopping regeneration before excess regenerative has entered the bed, a saving in regenerating solution is effected and reduction in rinse water is effected, keeping the water losses from regeneration to a minimum. (It is desireable to have only a small amount of by-product water of high salt content to dispose of.) In a preferred embodiment, a rotational digestor has a wheel which evaporates the waste-water solution.

13 Claims, 3 Drawing Figures

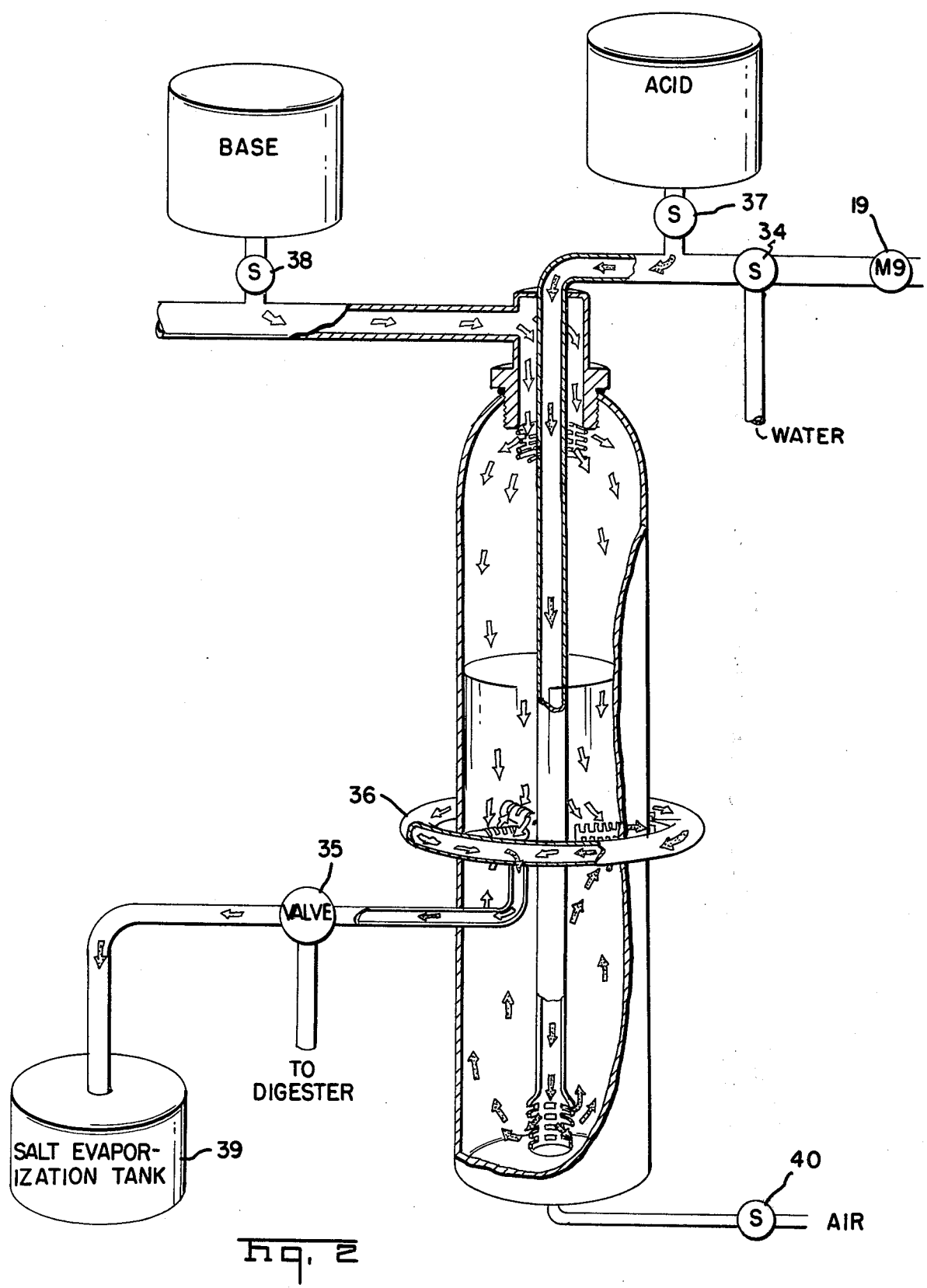

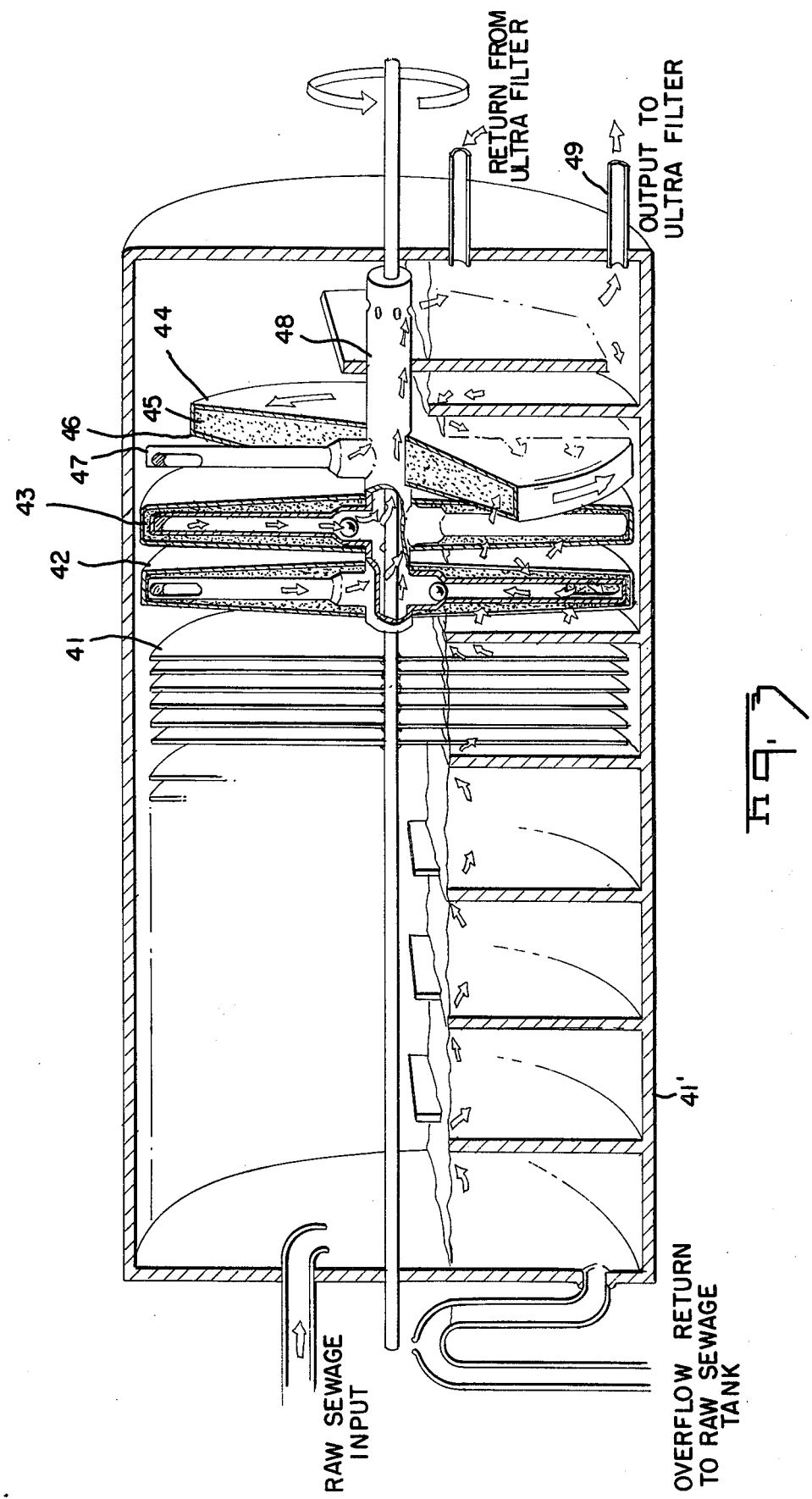

WATER RECYCLING SYSTEM

BACKGROUND OF THE INVENTION

This invention relates to waste-water processing systems and more particularly to a closed recycling system producing potable water from total domestic waste-water including household sewage.

A few municipal water treatment plants have processed total waste-water in a closed system to produce potable water. However, such systems are very expensive and require constant attention. Heretofore, it has been possible to provide such attention only in large systems.

There are many situations where a closed system is desirable for household use due to reduced central distribution and collection. Many home sites lack a fresh water supply, adequate sewage disposal, or both. A closed recycling system can be advantageously employed at such sites. Shortages of water supplies or treatment capacity can be solved by reducing water use and pollution.

SUMMARY OF THE INVENTION

In accordance with this invention, a closed water recycling system produces potable water from domestic waste water including household sewage. A microprocessor continually monitors the operation of the system, initiates filter back-flushing and demineralizer operation as required, and controls water quality.

In accordance with a specific embodiment, an ion exchange bed includes at least two different resins which are acid regenerated and base regenerated and which have different specific gravities. These resins are mixed during operation of the system, but are automatically separated according to specific gravity by back-flushing when the bed requires regeneration. Then, acid and base regenerating solutions are supplied to opposite sides of the bed. In accordance with the invention, the system monitors the position of the regenerate and its progress through the bed. Regeneration is stopped before the regenerate reaches the outlet, leaving just enough to complete regeneration without saturating the bed with excess. The regenerating solution remaining in the bed substantially completes regeneration. This results in a considerable saving in regenerating solution over the prior art systems in which regeneration was either overdone or stopped when the regenerate reached the outlet. This technique also reduces the rinse water requirements because it is not necessary to flush large quantities of unused regenerating solution from the bed.

Organic absorbant resin may also be used either separated from the ion exchange resin or in the same container. This resin is periodically cleaned in the system and possibly replaced at long intervals and cleaned outside for re-use. This absorbant eliminates trace organics, especially pesticides and carcinogens.

In accordance with a further aspect of this invention, the ultra-filter module in the system is periodically soaked with a cleaning solution, back-flushed in response to a monitored variable or otherwise regenerated. When required, the filter can be recycled, that is, water is run through the filter without a pressure differential to wash cake from the surface of the filter. A filter unit may also be used which requires no back-flushing to clean, as it would dissolve particles by biological digestion. The invention results in a greatly increased filter life without requiring constant personal attention which would otherwise be needed for a filter of this type.

In accordance with another aspect of this invention, the microprocessor also indicates to the user the operating conditions of the system. It produces an indication, for example by a buzzer, of a need for immediate service and of various other alarm or service requiring conditions in the system.

In accordance with another aspect of the invention, a rotating disk biological digestor includes various types of wheels, suitable for the growth of the various bacterial ecologies of the different stages of digestion. The digestor also may incorporate a settling unit to contain both active sludge and particulate matter until it is digested. The wheels and the compartment baffles may also be used for settling or otherwise separating active sludge from solution. More stages of digestion will then clean virtually all organic nutrients from solution, producing water of high quality for the final polishing.

The foregoing and other objects, features and advantages of the invention will be better understood from the following more detailed description and appended claims.

DESCRIPTION OF THE DRAWINGS

FIG. 2 shows the flow in the ion exchange bed during the regeneration mode; and

FIG. 3 shows the biological digestor.

DESCRIPTION OF THE PREFERRED EMBODIMENT

Figure 1:
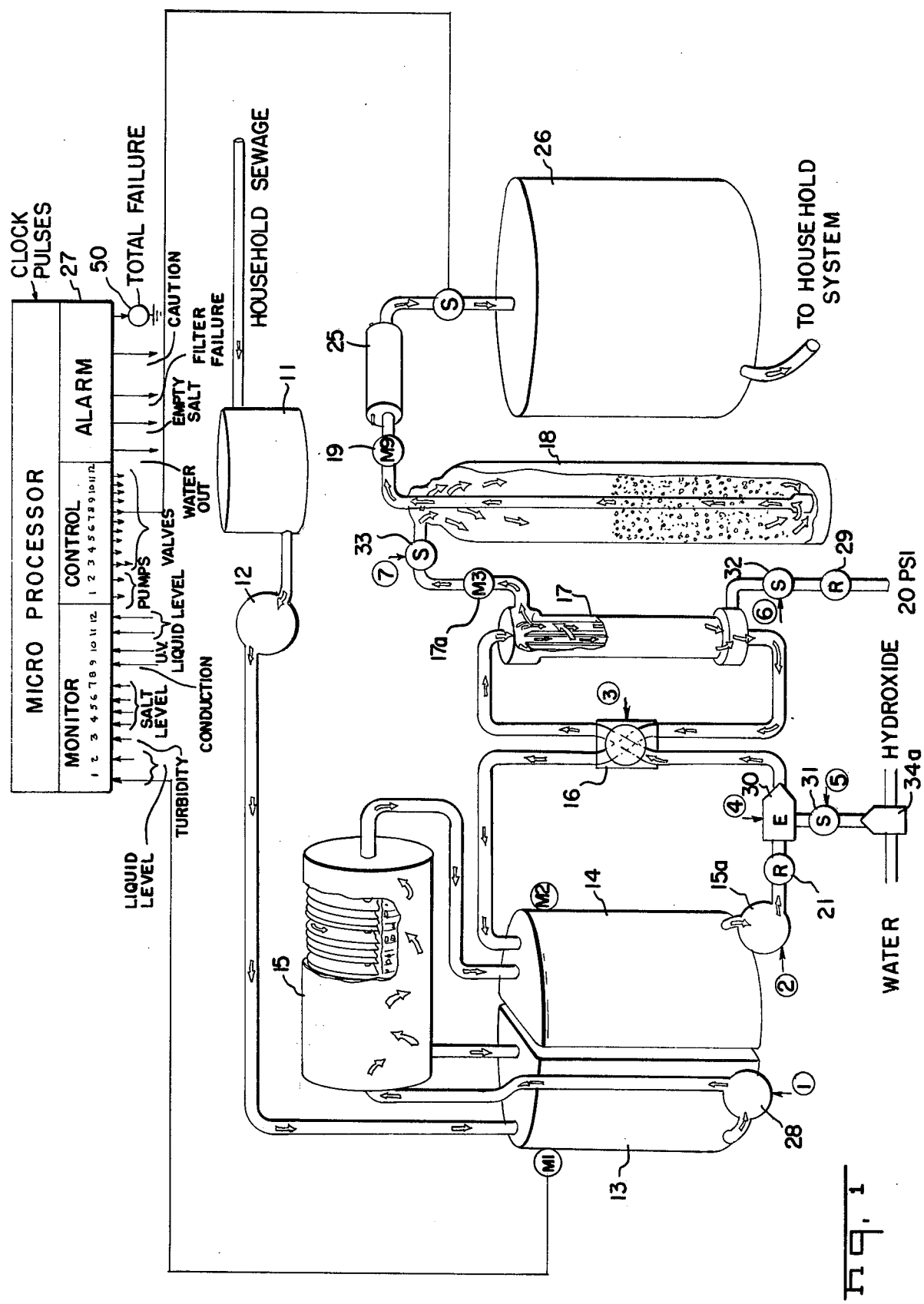
FIG. 1 is a view of the overall system.

Household sewage is supplied to holding tank 11 which supplies a pump and optional grinder 12. The grinder is at the lowest point of the sewer line. Solids are broken up into small particles and the resulting suspension is pumped to the buffer tank which includes a storage tank 13 for raw sewage and a tank 14 for digested sewage. The buffer tank has a volume which will hold the daily sewage output.

A biological digestor 15 includes a horizontal cylinder with rotating disks. As the disks rotate, they pick up sewage from the tank and expose it to the air where bacteria work on the sewage. The rotating and mixing action also aerates the entire digestor compartment. The digestor also includes other rotating wheels as will subsequently be described.

Pump 15a supplies digested sewage through valving 16 to the filtration unit 17. This can be an ultrafiltration cartridge where digested sewage is pumped at 25 psi through the luman (center of tube) of the ultrafiltration membrane or a dual bed filtration unit which operates at low pressure. This ultrafiltration unit is a polymer membrane of a type commercially available. Pressure is maintained by reducing valve 21, a bypass valve, control on pump 15a or another pressure regulation device. The output of the filter is between 2 and 4 psi. Most bacteria, viruses, and larger organic molecules will remain on the input side of the filter while only water peptides, coloring agents, organic acids, sugars, other small organics and dissolved salts pass through. Sensor 17a is a turbidity monitor which detects any breakthrough or filter failure in the system causing cloudiness in the water. This sensor constantly sends the microprocessor data on water cloudiness so in the event of filter failure it can shut down the system and sound the system down alarm.

The product water is next passed through a bed 18 of mixed ion exchange resins and organic absorbants. This mixture removes organics, color and almost all inorganic salts. A conductivity sensor 19 indicates when the resin has been depleted and requires regeneration.

The ion exchange bed 18 is homogeneously mixed in use, but must be separated into its elements for regeneration since the resins require different regenerants. Since the resins have different specific gravities, a back-flush causes expansion allowing the lower density resin to float to the top of the heavy resin. After separation, a 10% NaOH (Sodium Hydroxide) or other base solution is flowed from the top through the resin and a 10% Hcl (Hydrochloric Acid) or other acid solution is pumped up from the bottom through the more dense resin. The waste salts are drawn off through the center of the bed where the heavy and light resins are contiguous.

Monitors M-4 through M-8 continually monitor the location of the regenerate to determine when the beds have been sufficiently regenerated to be flushed. Typically, a salt band is produced during regeneration and the location of this salt band is, and concentration of regenerant are monitored. When regeneration is complete, air is introduced into the bottom of the bed to mix the bed before restoring it for service.

The product water is now completely odorless and contains less than three parts per million dissolved solids. As a final precaution, the water passes through an ultraviolet sterilizer 25. The use of the UV sterilizer as final sterilization gives not only sterilization capability, but the ability to draw in ozone produced in the air above the water and drawing that $O_3$ down into the water as it leaves the unit. This gives an additional element of sterilization. A catalyst can be used to prevent residual ozone from entering the house system.

The water is stored in a clean water storage tank 26 where it is available for household use.

The operation of the system is under the control of an integrated circuit microprocessor 27. Many commercially available chips are suitable for this purpose. One example of a microprocessor suitable for use in the 6503 chip available from MOS Technology. The microprocessor responds to on-off indications from monitors as well as some analog signals which monitor the variables of the system operation. Twelve monitors have been shown and are designated M-1 through M-12. The variables which are monitored by commercially available units suitable for use are as follows:

| | |
|---|---|
| M-1 | Liquid level in tank 13 |
| M-2 | Liquid level in tank 14 |
| M-3 | Turbidity |
| M-4 – M-8 | Salt band location monitors |
| M-9 | Conductivity |
| M-10 | Ultraviolet |
| M-11 & M-12 | Liquid level in tank 26 |

In response to these monitored variables, the microprocessor controls the system.

Pump 28 is turned on by microprocessor 27 until tank 14 is full as indicated by an output from level monitor M2. Pump 15a is turned on only if there is enough storage space in water cistern 26, i.e., monitor M-11 is actuated.

At intervals determined by filter pressure-drop or timing, the microprocessor performs a filter cleaning cycle. In order to do this it electrically changes the status of solenoid-operated valves. For example, valve 34a would be set to supply water which passes through the filter without a pressure differential. This washes the cake from the surface of the filter. Then a back-flushing operation is performed by reversing the positions of valves 30, 31, and 32. This allows water under pressure to flow through the filter, back through the reversing valve 16 to tank 14. This flushes out the cake which has been dislodged from the surface of the filter. When back-flush is completed, the reversing valve 16 is restored to the full line position shown in FIG. 1, and the other valves are operated to produce normal flow.

In another filter arrangement, the same basic scheme would be used to clean captured particles and recycle them in the system. In either technique of filtration, the backwash process which removes the collected suspended material, removes that material from the filter and returns it back to the digestor for eventual digestion. This technique is important for the operation of the unit in that it produces the smallest possible amount of by-product which will eventually be removed manually.

The filter 17 can undergo a cleaning solution soak in response to output of monitor M3. Depending on the filter set-up, air, mechanical agitation, line pressure water, or other methods may be employed to clean the filter at varying intervals.

The ion exchange bed 18 is regenerated in response to an output from conductivity monitor M-9 indicating that regeneration is required. In response to this indication, microprocessor 27 first performs a back-flush to separate the resins into beds by specific gravity. Valve 33 is closed. Referring to FIG. 2a, valve is opened to the digestor line so that water from the cistern flows into the bed tank and out through the tank. The water flow through the tank causes the lower density resin to float to the top of the heavy resin. After this operation, valve 34 is closed, valves 37 and 38 are opened. Valve 35 is set to the line leading to the salt evaporation tank 39 when the salt band reaches the distributor. This allows a 10% sodium hydroxide solution to flow to the top of the bed and through the light resin and 10% hydrochloric acid solution to flow up from the bottom through the heavy resins. In regeneration, the $H^+$ ions are exchanged for sodium and calcium and other anions in the spent resins to produce NaCl and CaCl, etc. This results in a salt band which moves up in the tank as regeneration proceeds. Monitors M-4 through M-8 (not shown) monitor the position of the salt band as it moves up in the tank. Before the salt band reaches the outlet distributor 36, regeneration is stopped. A small amount of rinse water is introduced to complete the regeneration and remove the remaining salts. The valve 40 is opened to introduce air into the bottom of the bed which mixes the bed, thereby restoring it for normal service. The microprocessor closes valves 35, 37 and 38, and opens valves 33 and 34.

The foregoing is a great improvement over prior art techniques which, for example, stop regeneration when regenerate is detected at the outlet or excessive regenerate is used. In such prior art techniques, the system could not be restored to potable water production until the remaining acid was flushed from the system. Not only is this time consuming, but also it requires excessive flushing which produces excessive wasteproducts which are unacceptable in a closed system. Precise monitoring of the regenerate reduces the flush water requirements from the normal 50 to 150 gallons per cubic foot of resin to 5 to 10 gallons of water per cubic foot.

The following is one example of a resin mixture suitable for use: one part organic absorber such as XDA3, 5 parts weak base anion exchange resin such as IR93; and 5 parts strong cation exchange resin such as IR120, all available from Rohm and Haas Company, Philadelphia, Pa.

In addition to the control functions just described, the microprocessor also performs alarm functions. In the event of a system failure, as indicated by the monitors, the system is shut down by the microprocessor 27 which closes all valves in the system. Concurrently, a buzzer 50 is energized to indicate system failure. Other indicators are provided to signal the user/serviceman that some action is required. For example, empty the salt evaporation tank, replace the filter, replace the ultraviolet sterilizer lamp and so on.

Referring to FIG. 3, the biological digestor includes a cylindrical tank 41, the bottom half of which is divided into compartments. Conventional bacteria disks such as 41 rotate through the sewage lying in the bottom of the tank. As the disks rotate, they expose the sewage to the air, where bacterial action works on the sewage. The biological digestor also includes unique filter pump disks 42, 43, and 44. Each of these disks includes a porous structure 45 which supports an outer permeable membrane 46. This may also be accomplished by a settler or other separation methods, for example, biological upflow filtration or electrical migration. The membrane is a felted polypropylene or dacron fiber material. Water diffuses through the membrane 46. Water scoops 47 in each of the disks scoop up the diffused water. As the scoops 47 rotate to the top, water flows through the center collector 48 to the outlet 49.

The system has the capability of using low cost, low accuracy sensors and using the microprocessor to perform all of the necessary compensation as well as correction calculations. The microprocessor can do computation of the input data, do analysis and optimize the operation of the system as well as operate the system unattended. The microprocessor provides constant surveillance of the operation of each of the components of the system: UF — turbidity, resin bed — conductivity, UV — UV intensity, and transmission of water, temperature at critical points, tanks — level. Fail-safe controls shut down the system or part of the system and/or warn of a system failure or need for service. An optional printer may be controlled by the CPU to printout water quality and/or diagnostic data.

Microprocessor as used herein means an electronic controller having logic capability built as a single chip or by integrated circuits.

While a particular embodiment of the invention has been shown and described, varying modifications may be made without departing from the true spirit and scope of the invention. The appended claims are, therefore, intended to cover all such modifications.

What is claimed is:

1. A closed water recycling system producing potable water from waste-water comprising:
    a buffer for storing said waste-water,
    a filtration unit for removing virus, bacteria and organic molecules from said waste-water,
    a biological digestor connected between said buffer and said filtration unit for exposing sewage in said waste-water to the air,
    a demineralizer for removing organic materials, color and inorganic salts from said waste-water,
    a water cistern for storing water which has been processed by said filtration unit, said biological digestor and said demineralizer,
    monitoring means for monitoring the operation of said filtration unit and said demineralizer and for monitoring the level in said buffer and in said water cistern, and
    a microprocessor responsive to the output of said monitoring means for controlling the intermittent flow of water between said buffer and said cistern and the intermittent backflushing of said filtration unit, and monitoring water quality fail-safe controls.

2. The system recited in claim 1 wherein said microprocessor controls the operation of a demineralizer which comprises a bed including at least two different resins which are acid regenerant and base regenerated and which have different specific gravities,
    said monitoring means including a bed monitor at the output of said bed for indicating when said resins have been depleted and require regeneration,
    means controlled by said microprocessor for backflushing said bed in response to said indication of said monitor,
    said back-flushing separating said resins according to specific gravity,
    means controlled by said microprocessor for supplying an acid regenerating solution to one side of said bed and a base regenerating solution to the other side of said bed in response to the indication from said bed monitor,
    an outlet near the middle of said bed for removing regenerant solution during regeneration, and
    a regeneration monitor in said bed connected to said microprocessor to stop said regeneration before the entire bed is regenerated.

3. The system recited in claim 2 wherein said regeneration monitor is a salt monitor positioned a distance from said outlet so that the salt band produced during regeneration by ion exchange in said bed is detected before it reaches said outlet, thereby permitting the regenerating solutions already in said bed to move said salt band to said outlet.

4. The system recited in claim 1 wherein said monitoring means includes a filter monitor producing an output indicating that said filtration unit requires backflushing, and
    means controlled by said microprocessor for backflushing said filtration unit in response to the output of said filter monitor.

5. The system recited in claim 1 further comprising:
    a sterilizer for final sterilization of processed water.

6. The system recited in claim 1 wherein said biological digestor comprises:
    rotating disks in a tank partially filled with wastewater which is exposed to the air as said disks rotate.

7. The system recited in claim 6 wherein said biological digestor further comprises:
    a rotating wheel having a permeable outer membrane, said waste-water diffusing through said permeable membrane to the inside of said wheel, and
    a water scoop for transferring and controlling water from inside the digestor to said system.

8. The method of processing waste-water into potable water comprising:

biologically digesting sewage in said waste-water,
filtering virus, bacteria and organic molecules from said waste-water,
intermittently passing said waste-water through ion exchange resins to remove organic materials, color, and inorganic salts,
monitoring the requirement for backflushing of the filter and conductivity of water passing through said ion exchange resins, and
controlling the intermittent back-flushing of said filter and the regeneration of said resins with a microprocessor connected to respond to said monitoring.

9. The method recited in claim 8 wherein said resins are in a bed which includes at least two different resins which are acid regenerated and base regenerated and which have different specific gravities, said method further comprising:
mixing said resins for operation of said system, continually monitoring the operation of said system to indicate when said bed requires regeneration,
in response to the foregoing indication, automatically separating said resins according to specific gravity by flushing water through said bed,
supplying acid regenerating solution to one side of said bed and base regenerating solution to the other side of said bed,
monitoring the level of the regenerant front and of the salt band produced by ion exchange in said bed, and
automatically stopping the flow of regenerating solution to said bed before said regenerant front reaches the outlet of said bed, thereby permitting the regenerating solution remaining to complete regeneration.

10. An ion exchange bed for a water treatment system comprising:
a tank for containing ion exchange resins, an inlet and an outlet in said tank for flow of water to be treated through said bed,
means for supplying regenerating solution to said bed,
an outlet for removing regenerant from said bed during regeneration, and
a monitor for monitoring the position of the regenerant in said bed, said monitor being connected to stop regeneration before said regenerant reaches said outlet.

11. The bed recited in claim 10 wherein said tank includes acid and base regenerated resins having different specific gravities,
means for supplying a base regenerating solution to one side of said bed,
means for supplying an acid regenerating solution to the other side of said bed, said outlet for regenerate being positioned near the middle of said bed, said monitor stopping said regeneration before the position of said regenerant reaches the middle of said bed.

12. A biological digestor for a water treatment system comprising:
a tank adapted to be partially filled with waste-water,
means for supplying waste-water to said tank,
rotating disks mounted in said tank for exposing said water to the air,
a rotating wheel having a permeable outer membrane, said rotating wheel being mounted in said tank, said water diffusing through said membrane to the inside of said wheel, and
a separation unit, and
a water scoop inside said rotating wheel for transferring water from the inside of said wheel to said separation unit.

13. A closed water recylcing system producing potable water from waste-water comprising:
a buffer for storing waste-water,
a biological digestor for decomposing sewage in said waste-water, waste-water from said buffer being supplied to said biological digestor,
a filtration unit including an ultra-filtration membrane for removing virus, bacteria and organic molecules from said waste-water,
multiple ion exchange resins for removing organic materials, color and inorganic salts,
a water cistern for storing processed water,
means for intermittently moving water between said digestor, filtration unit, ion exchange resins and water cistern which are connected in a closed recycling system,
monitoring means for monitoring the operation of said system, and
a microprocessor responsive to the output of said monitoring means for controlling said means for intermittently moving water.

* * * * *

UNITED STATES PATENT AND TRADEMARK OFFICE
CERTIFICATE OF CORRECTION

PATENT NO. : 4,145,279
DATED : March 20, 1979
INVENTOR(S) : Howard W. Selby, III It is certified that error appears in the above-identified patent and that said Letters Patent are hereby corrected as shown below:

In the Abstract, line 1, "portable" should read -- potable --.

In the Abstract, line 13, "bas" should read -- base --.

In the Specification, column 3, line 42, "in" should read -- is --.

Column 6, Claim 1, line 14, after "quality" insert --and--.

Column 8, Claim 13, line 26, "recylcing" should read --recycling--.

Signed and Sealed this

Tenth Day of July 1979

[SEAL]

Attest:

LUTRELLE F. PARKER
Attesting Officer  Acting Commissioner of Patents and Trademarks